(12) United States Patent
Rahm

(10) Patent No.: US 7,791,000 B2
(45) Date of Patent: Sep. 7, 2010

(54) METHOD FOR WELDING A ROTATIONALLY SYMMETRICAL PART OF A HUB PART

(75) Inventor: Manfred Rahm, Rein (AT)

(73) Assignee: MAGNA Powertrain AG & Co. KG, Lannach (AT)

(*) Notice: Subject to any disclaimer, the term of this patent is extended or adjusted under 35 U.S.C. 154(b) by 852 days.

(21) Appl. No.: 10/551,638

(22) PCT Filed: Mar. 22, 2004

(86) PCT No.: PCT/AT2004/000106

§ 371 (c)(1),
(2), (4) Date: Jul. 31, 2006

(87) PCT Pub. No.: WO2004/087365

PCT Pub. Date: Oct. 14, 2004

(65) Prior Publication Data

US 2007/0034612 A1 Feb. 15, 2007

(30) Foreign Application Priority Data

Mar. 31, 2003 (AT) .......................... GM223/2003 U

(51) Int. Cl.
*B23K 26/20* (2006.01)
(52) U.S. Cl. .................... 219/121.64; 228/135
(58) Field of Classification Search ............ 219/121.64, 219/121.63, 121.83, 121.85; 228/135
See application file for complete search history.

(56) References Cited

U.S. PATENT DOCUMENTS

| | | | | |
|---|---|---|---|---|
| 3,620,421 A | * | 11/1971 | MacGuire-Cooper | 222/402.21 |
| 3,834,138 A | * | 9/1974 | Gibson | 56/290 |
| 3,999,277 A | * | 12/1976 | Hamada | 29/447 |
| 4,095,077 A | * | 6/1978 | Schneider et al. | 219/61 |
| 4,154,464 A | * | 5/1979 | Stary | 285/124.1 |
| 4,244,535 A | * | 1/1981 | Moodie | 242/609 |
| 4,390,301 A | * | 6/1983 | Winckelhaus | 403/27 |
| 4,406,640 A | * | 9/1983 | Franklin et al. | 464/91 |
| 4,722,630 A | * | 2/1988 | Fang | 403/30 |
| 4,738,388 A | * | 4/1988 | Bienek et al. | 228/135 |
| 4,768,750 A | * | 9/1988 | Wilson | 251/308 |
| 4,770,019 A | * | 9/1988 | Kuramoto et al. | 72/181 |
| 4,896,408 A | * | 1/1990 | Fraser | 29/889.1 |
| 4,995,856 A | * | 2/1991 | Heindl et al. | 604/8 |
| 5,132,495 A | * | 7/1992 | Ewing et al. | 174/138 F |
| 5,865,363 A | * | 2/1999 | Barrett et al. | 228/173.4 |

(Continued)

FOREIGN PATENT DOCUMENTS

EP 0763396 A2 * 3/1997

*Primary Examiner*—Samuel M Heinrich
(74) *Attorney, Agent, or Firm*—Bachman & LaPointe, P.C.

(57) ABSTRACT

A method of connecting a rotationally symmetrical part (11) having precision-machined functional surfaces (16) to a hub part (21) by welding is to deliver a distortion-free end product. To this end, the rotationally symmetrical part (11) and the hub part (12), in their longitudinal sections, are dimensioned in such a way that, when the rotationally symmetrical part (11) is shrunk onto or pressed onto the hub part (12), stresses are produced in the former and said stresses produce deformations which are opposed to the stresses to be expected during the subsequent welding and to deformations caused by said stresses. This is achieved by one of the contact surfaces (14; 15) being conical or by shaping the rotationally symmetrical part (11).

7 Claims, 5 Drawing Sheets

U.S. PATENT DOCUMENTS 6,410,165 B1 * 6/2002 Warren et al. ............... 428/680
6,559,418 B1 * 5/2003 Sorg ........................... 219/149
6,848,180 B2 * 2/2005 Shimizu .................... 29/889.2
2006/0162145 A1 * 7/2006 Verger et al. ............. 29/525.11

* cited by examiner

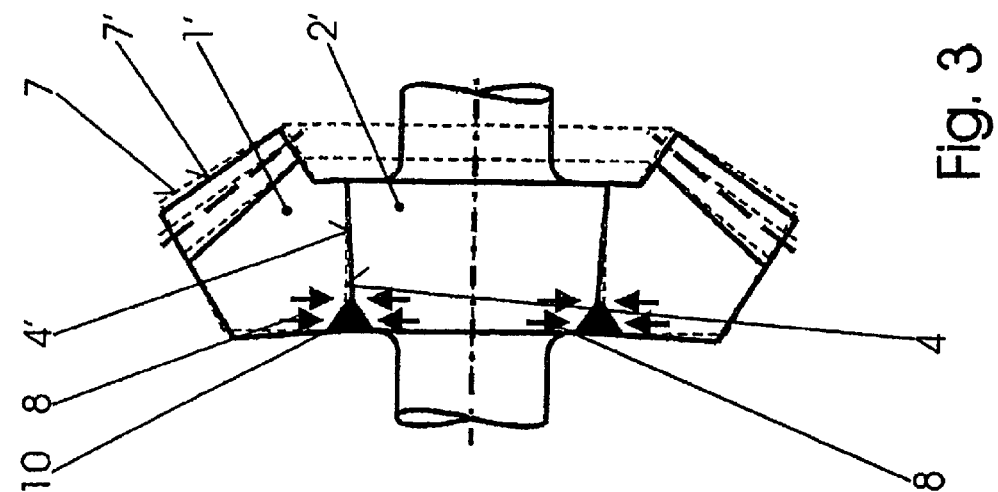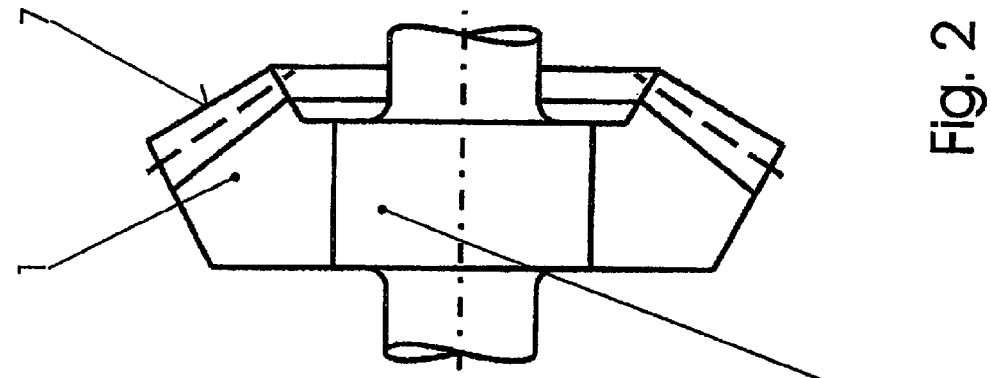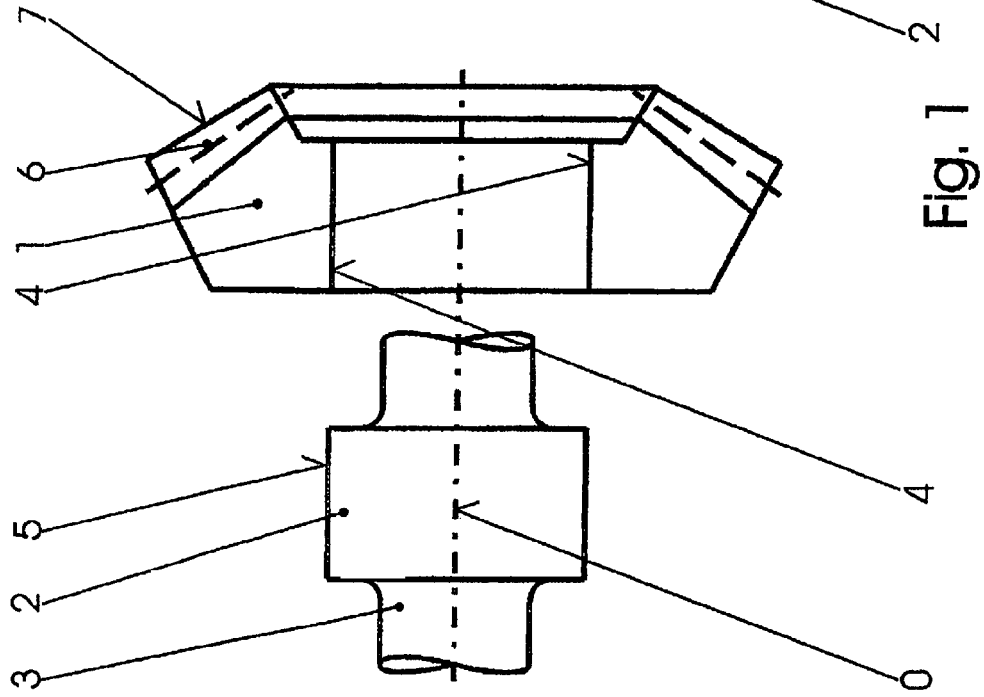

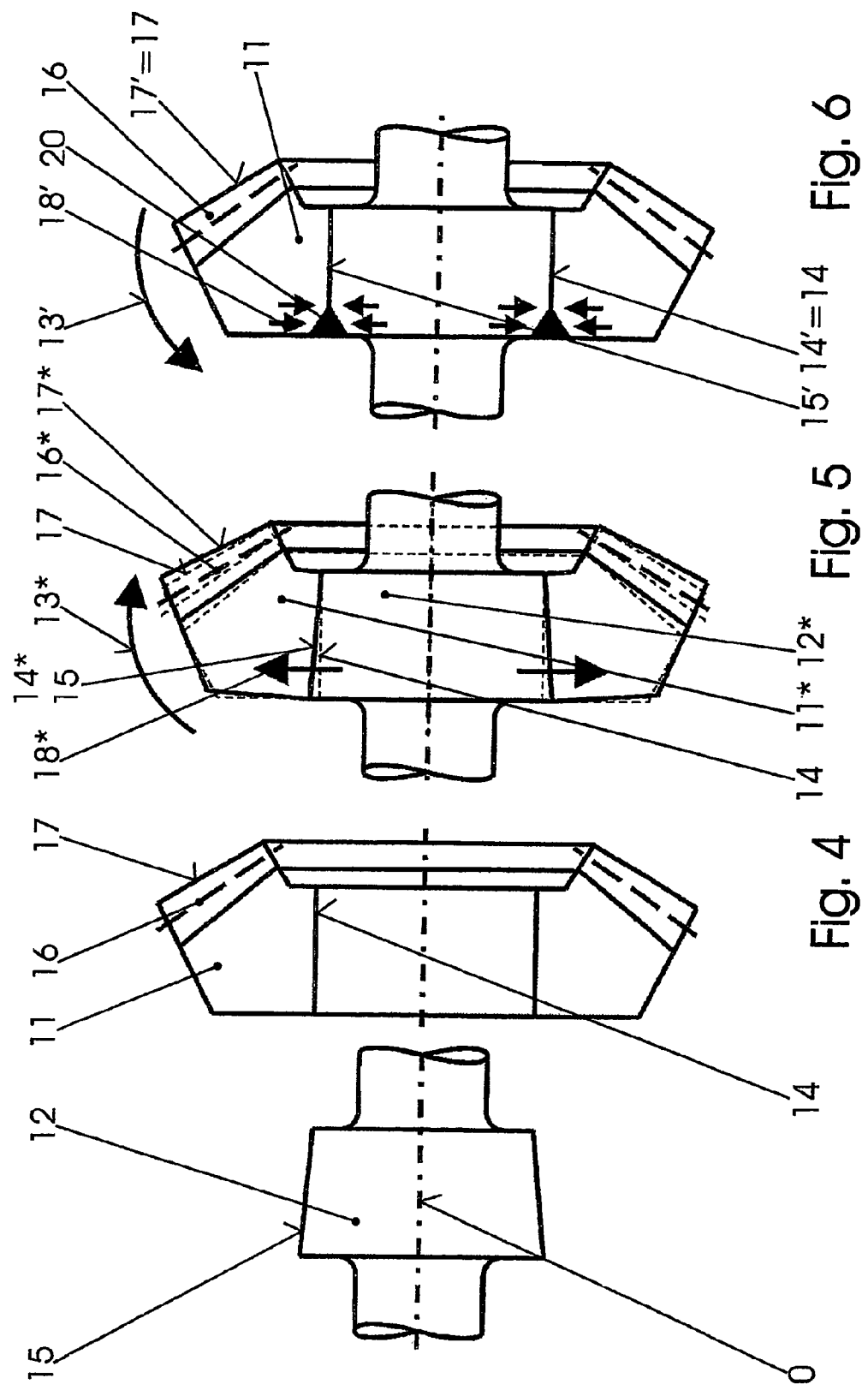

METHOD FOR WELDING A ROTATIONALLY SYMMETRICAL PART OF A HUB PART

BACKGROUND OF THE INVENTION

The invention relates to a method of connecting a rotationally symmetrical part to a hub part by welding, the contact surfaces to be connected to one another being essentially cylindrical and the rotationally symmetrical part having functional surfaces, the accurate position and/or angle of which is essential to the function. The expression "functional surfaces" refers, for example, to the rolling surfaces of a gear or to the sealing surfaces of a pump rotor. The expression "essentially cylindrical" means that the contact surfaces are not surfaces normal to the axis but exert a certain centering effect. The hub part may also be part of the shaft carrying the rotationally symmetrical part or may be this shaft itself. In the case of gears, consideration is given in particular to the crown wheel of an axle drive for motor vehicles, the shape and position of the functional surfaces of said crown wheel resulting in high susceptibility to angular distortions due to welding stresses, but especially high demands are imposed on the accuracy of the engagement with said crown wheel.

Such rotationally fixed connections between shaft and hub or between a hub and a rotationally symmetrical part are normally produced merely by pressing on or by shrinking on, with especially high and fluctuating forces, as occur inter alia, for instance, at the crown wheel in the axle drive of a motor vehicle, by high-strength body-fit bolts. However, the connection by means of body-fit bolts is costly and requires considerable construction space. Welded connections are also conceivable, but are not advisable where there are functional surfaces of high accuracy on account of the welding distortion.

SUMMARY OF THE INVENTION

According to the invention, a method of reliably connecting such finish-machined, high-precision parts in mass production by welding is provided. In the method of the invention, the parts to be connected, in their longitudinal sections containing the rotation axis, are dimensioned in such a way that stresses are produced in the rotationally symmetrical part when the latter is pressed on or shrunk on, and said stresses produce deformations which are opposed to the stresses to be expected during the subsequent welding and to deformations caused by said stresses.

A joining operation therefore precedes the welding. The joining operation is deliberately designed in such a way that the part to be fitted is deformed, to be precise, in direction and magnitude, in opposition to the deformation caused by the welding distortion, which appears after the welding. The joint can be designed according to known methods, in particular using an FE method (FE=finite element). Pressing-on and shrinking-on are equivalent inasmuch as stresses are produced in the contact surfaces in both connections, in the first case by elastic deformation, in the second by thermal expansion.

There are two ways to design the joint and dimension the components to be connected, which are each feasible on their own or together. The first way consists in the fact that:

the rotationally symmetrical part is pressed or shrunk onto the hub part, at least one of the two contact surfaces having different radii along the axial direction in such a way that, when the rotationally symmetrical part is put on, stresses are produced therein which are higher on the one side than on the other side, and the functional surfaces are displaced in one direction, and the welding is then effected on the one side, the functional surfaces returning again into the original accurate position due to the welding.

It is advantageous for tolerance and cost reasons if one of the surfaces to be connected to one another is cylindrical and only the other has different radii in the axial direction, the smaller radius being on the side of the weld in the case of different radii of the outer surface or the larger radius being on the side of the weld in the case of different radii of the inner surface. Considered in the tolerance zone, this means that the diameters of the mating surface overlap on the side of the welding.

The different radii can be produced by stepping, which is simpler, but an unsteady stress characteristic over the length can be expected. It is better if the other surface of the surfaces to be connected to one another is conical, the smaller radius of the cone being on the side of the weld in the case of a conical outer surface or the larger radius of the cone being on the side of the weld in the case of a conical inner surface.

The second way of actually realizing the invention consists in the fact that:

the longitudinal section, containing the rotation axis, of the rotationally symmetrical part, between the contact surface and the functional surface, has a constriction which is offset axially relative to the area center of the sectional plane lying outside the constriction, so that the functional surfaces of the rotationally symmetrical part are displaced in one direction when being pressed on or shrunk on, the welding is then effected, as a result of which the functional surfaces return again into the original accurate position.

This way is certainly the more elegant way, since it requires no conical or stepped contact surfaces. However, it is not feasible with all basic forms and loading states. In particular, the resultant of the forces transmitted via the constriction is offset axially relative to the area center of the sectional plane lying outside the constriction. It is especially advantageous if the product thus produced is a crown wheel, since considerable angular changes due to welding distortion may occur on account of its shape and a constriction can also be readily accommodated from the design point of view.

Since the invention shows a way of compensating for welding distortions instead of preventing them, it is suitable in principle for most welding processes. Of course, especially good results will be achieved if the welding is effected by means of a high-energy beam, in particular a laser beam.

BRIEF DESCRIPTION OF THE DRAWINGS

The invention is described and explained below with reference to figures, where:

FIG. 1 shows a connection according to the prior art, first phase,

FIG. 2 shows the connection as in FIG. 1, second phase,

FIG. 3 shows the connection as in FIG. 1, third phase,

FIG. 4 shows a first embodiment of the connection according to the invention, first phase, FIG. 5 shows the connection as in FIG. 4, second phase, FIG. 6 shows the connection as in FIG. 4, third phase.

DETAILED DESCRIPTION

Figure 7:
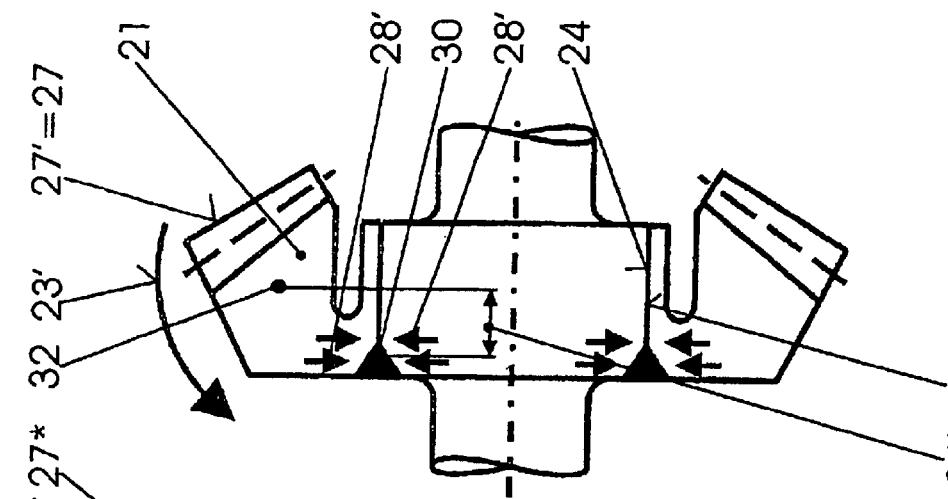
FIG. 7 shows a second embodiment of the connection according to the invention, first phase.

FIG. 1 shows a rotationally symmetrical part 1 and a hub part 2 before they are connected. Here, the rotationally symmetrical part 1 is the crown wheel of an axle drive which meshes with a driving pinion (not shown). Its tooth flanks 6 are the functional surfaces, the accuracy of which is very important for the operation. The tip cone of these teeth is designated by 7, its position, also typical of all the other functionally important dimensions of the functional area, will be considered below. The rotationally symmetrical part 1 has a cylindrical contact surface 4 on its smallest diameter. The hub part 2, here in one piece with a shaft 3, has an outer contact surface 5, which according to the prior art is likewise cylindrical. The tolerance zones of the contact surfaces 4, 5 are selected in accordance with a light interference fit. The rotation axis of both parts to be connected is designated by 0.

The interference fit between the two parts 1, 2 is produced in FIG. 2. The position of the tip cone 7 remains unchanged if the pressure exerted approximately equally over the axial length by the interference fit has not led to any deformation of the rotationally symmetrical part 1.

FIG. 3 shows the rotationally symmetrical part 1' and the hub part 2' after welding has been completed. Due to its shrinkage, the cooled weld 10 exerts shrinkage forces on the two parts 1', 2', these shrinkage forces being indicated by the arrows 8 and leading to a change in shape of the rotationally symmetrical part 1'. This can be seen by comparing the contours 7, 4 depicted by a broken line with the contours 7', 4' depicted by a solid line. The tip cone 7 has become the tip cone 7'. This angular deviation has a very adverse effect on the interaction between crown wheel and driving pinion. So much for the prior art.

In FIG. 4, the rotationally symmetrical part 11 again has a contact surface 14 and functional surfaces 16 with the tip cone 17, that is to say it is unchanged compared with that in FIG. 1. The contact surface 15 of the hub part 12, however, is conical. The conicity is optimized for achieving the effect according to the invention, which may be effected by trial and error, but may be effected especially accurately by calculation according to the finite element method. The hub part 12 is pressed into the rotationally symmetrical part 11.

FIG. 5 shows the parts 11, 12 thus combined after they have been pressed on and pressed in, respectively. Due to the pressing-in, the rotationally symmetrical part 11 (only depicted by broken lines in FIG. 5) has been deformed to 11*. Its contact surface 14 (broken line) has been deformed into the slightly conical contact surface 14*, and its tip cone 17 (broken line) has been deformed into the tip cone 17*(solid line). This deformation can be attributed to the forces caused by the pressing-in, which are indicated by the arrows 18* and act radially outward on one side. These forces are of course greatest on the side of the largest diameter of the contact surface 15, for which reason the arrow 18* is also on this side. The force introduced on one side results in an angular deviation, indicated by the arrow 13*, of the tip cone 17 to 17*.

FIG. 6 shows the next stage, after the welding. The weld 20, shrinking during the cooling, exerts tensile forces 18', indicated by the arrows 18', on the rotationally symmetrical part 11. Since these tensile forces 18' again act only on the side of the weld 20, but in the opposite direction, they cause an angular restoration 13'. The latter leads to the tip cone being drawn from the position 17* in FIG. 5 into the position 17'.

Given the correct design of the interference fit, the angular restoration 13' is equal to the angular deviation 13* of FIG. 5 and the tip cone 17' is again congruent with the original tip cone 17. Therefore, despite welding on one side, the connection according to the invention has not resulted in any displacement of the high-precision functional surfaces.

Figure 8:
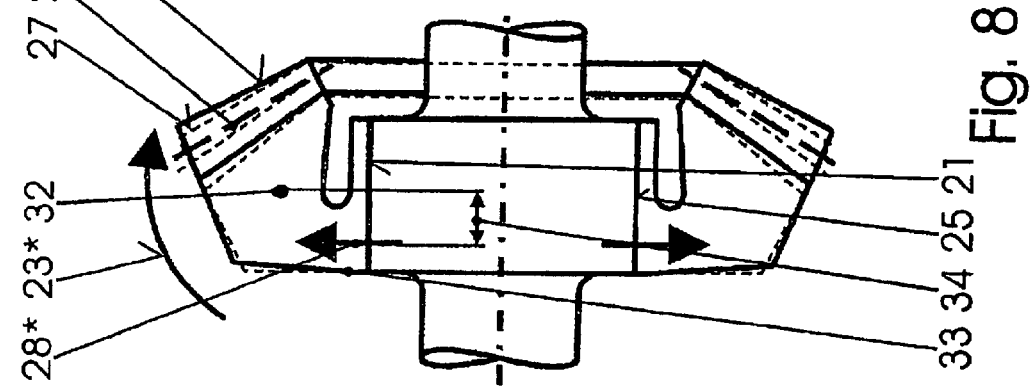
FIG. 8 shows the connection as in FIG. 7, second phase.
Figure 9:
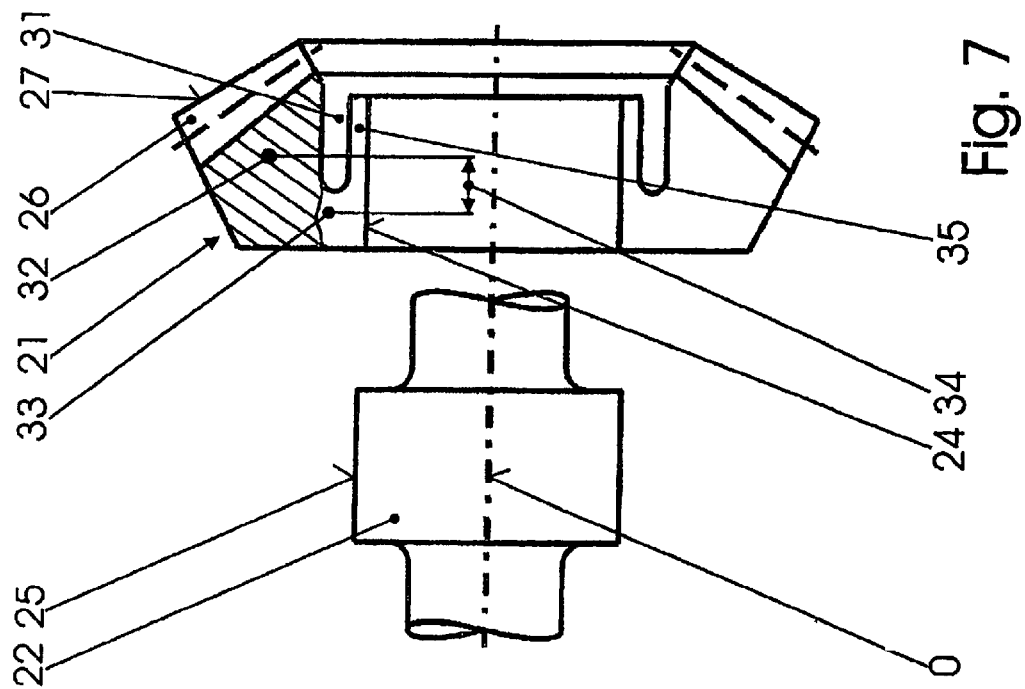
FIG. 9 shows the connection as in FIG. 7, third phase.

However, the invention can also be realized in another way, as shown in FIGS. 7, 8 and 9. In FIG. 7, the hub part 22 has a cylindrical contact surface 25. The rotationally symmetrical part 21 also has a cylindrical contact surface 24, the tolerance zones of the diameters of the two contact surfaces 24, 25 again establishing the interference fit. The effect according to the invention is achieved here by the rotationally symmetrical part 21 having an encircling groove 31 which, in the longitudinal section shown, forms a constriction 33 between the main cross section having an area center 32 and a sleeve part 35. The determination of the area center 32 is not dealt with in any more detail, since this is done according to the rules of statics. In any case, the constriction 33 is offset relative to the area center 32 in the direction of the zero axis by a distance designated by 34. This offset is essential. The sleeve part 35 remains inside the groove 31 and participates in the interference fit over its entire axial length.

FIG. 8 shows the arrangement of FIG. 7 after the hub part 22 has been pressed into the rotationally symmetrical part 21. The pressure, developed in the process and acting outward, between both contact surfaces 24, 25 is introduced into the main cross section of the rotationally symmetrical part 21 only in the region of the constriction 33. This again results in an angular deviation 23*, which causes a displacement of the tip cone 27 (broken line) to the position 27* (solid line). This force directed outward is indicated by the arrow 28*. A weld preparation has deliberately not been depicted here, since it is established in accordance with the respectively selected welding process. The two parts 21, 22 are now welded, for example by means of a high-energy beam, in particular by means of a laser.

FIG. 9 shows the connected parts after the welding and cooling. The welding 30 has been carried out from the side on which the constriction 33 is also located. The cold weld again exerts a tensile force, indicated by the arrows 28', on the main cross section with the area center 32 of the rotationally symmetrical part 21, this tensile force again being offset axially relative to the area center 32 by a distance 34'. The angular restoration thus brought about, arrow 23', returns the tip cone 27* and the associated functional surfaces back into the position 27', which, given the correct design, is again equal to the original position 27.

Figure 10:
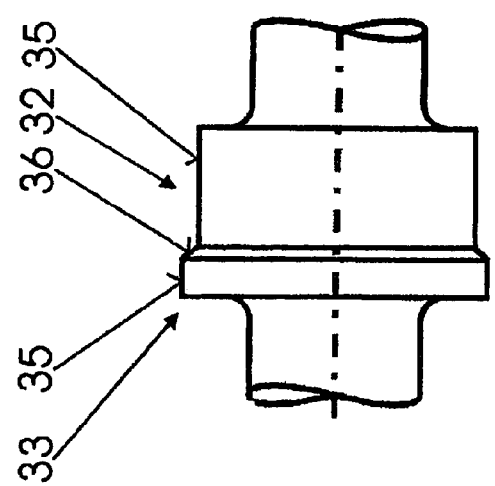
FIG. 10 shows a variant of the first embodiment.

In the variant in FIG. 10, the contact surface 33 of the hub part 32 is not conical as in FIG. 4 but consists of two (or more) stepped cylindrical surfaces 34, 35 of different diameters, separated by a conical bevel 36.

Figure 11:
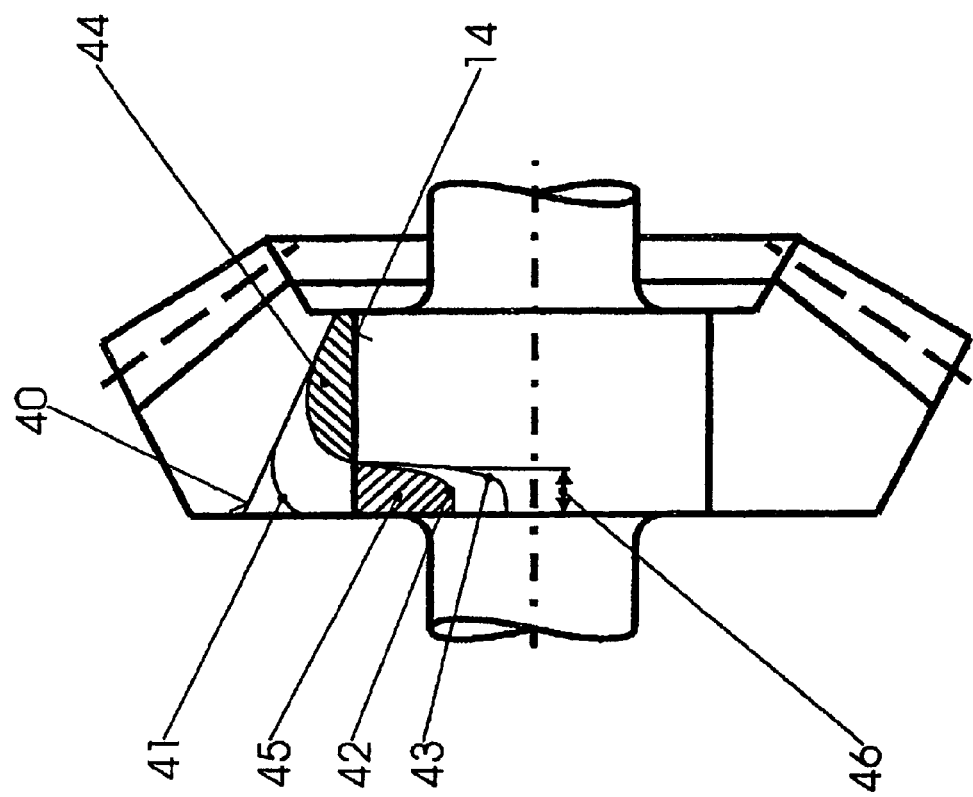
FIG. 11 shows a scheme of the stress characteristic with respect to FIGS. 4, 5 and 6.

FIG. 11 shows the stress characteristic in the contact surfaces 14, 15 in the arrangement in FIG. 4. There, the line of the contact surface 14 may be regarded as the zero axis, from which the local stresses are plotted, positive toward the top and negative toward the bottom. The curve 40 represents the stress characteristic after the hub part has been pressed in and is approximately a straight line; the curve 41 represents the stress distribution during the welding, that is to say at maximum temperature; and the curve 42 represents the shrinkage stress produced during the cooling of the metal of the weld pool. The curve 43 is then the resultant of the curves 41 and 42; the areas 44 and 45, in each case hatched, are identical. The depth of the weld (not depicted) is designated by 46.

Figure 12:
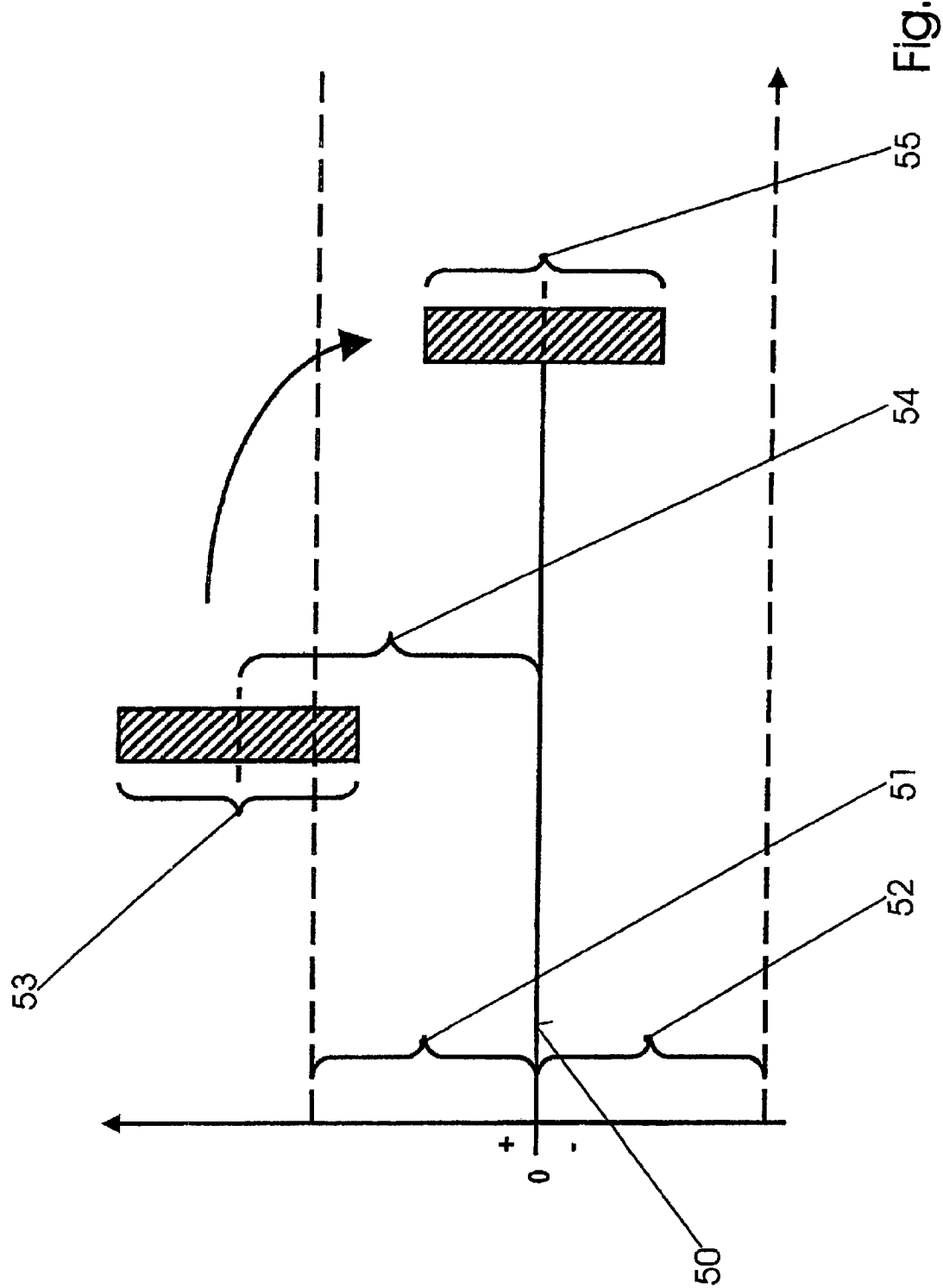
FIG. 12 shows the corresponding tolerance zones.

FIG. 12 shows the effects which can be achieved in practice with the method according to the invention. The horizontal axis 50 is a time axis without a scale, from which the positive deviations are depicted toward the top and the negative deviations are depicted toward the bottom. Ranges defined with the brackets 51, 52 are the ranges of the permissible positive and negative angular deviations, respectively. The actual dimensions of the finished workpiece are to lie within this range. However, the welding according to the prior art produces an angular deviation which results in a tolerance zone designated with the bracket 53 and displaced toward a positive angular deviation. It can be seen that only a small part lies within the range of the permissible angular deviation. Its average value is at the distance 54 above the zero axis of the tolerance zones. This is remedied by the measures according to the invention, which return the tolerance zone 53, given the correct design, into the range 55, which lies exactly symmetrical to the zero axis of the desired tolerance zone.

The invention claimed is:

1. A method for securing a rotational symmetrical part to a hub part along an axial direction (O), wherein the rotational symmetrical part comprises (1) a contact surface which defines an opening into which the hub part is inserted along an axial direction (O), and (2) a functional surface comprising a functional surface, and the hub comprises a contact surface, the method comprising the steps of:

inserting the hub part into the opening of the rotational symmetrical part wherein the contact surface of the hub part engages the contact surface of the rotational symmetrical part in an interference fit to produce an angular deviation of the functional surface from a first position to a second position; and welding the hub part to the rotational symmetrical part at a point of contact of the contact surface of the hub part and the contact surface of the rotational symmetrical part to produce an angular deviation of the functional surface from the second position to the first position.

2. A method according to claim 1, including providing one of the contact surface of the hub and the contact surface of the rotational symmetrical part with at least two contact surfaces having different radii comprising a smaller radius and a larger radius with respect to the axial direction (O).

3. A method according to claim 1, including providing one of the contact surface of the hub and the contact surface of the rotational symmetrical part with a conical shape with respect to the axial direction (O).

4. A method according to claim 1, including providing an encircling groove in a portion of the gear wheel between the contact surface and the functional surface, wherein the encircling groove is deformed upon insertion of the hub part to produce the angular deviation of the functional surface from the first position to the second position.

5. A method according to claim 2, wherein the smaller radius is on the side of the weld when the different radii is on the contact surface of the rotational symmetrical part and the larger radius is on the side of the weld when the different radii is on the contact surface of the hub.

6. A method according to claim 3, wherein the smaller radius of the conical shape is on the side of the weld in the case of a conical shape of the contact surface of the rotational symmetrical part and the larger radius of the conical shape is on the side of the weld in the case of a conical shape on the contact surface of the hub.

7. A method according to claim 1, wherein the rotational symmetrical part is a crown wheel and the functional surface is a tip cone.

\* \* \* \* \*